United States Patent [19]

Ohzono et al.

[11] Patent Number: 4,613,026
[45] Date of Patent: Sep. 23, 1986

[54] FRICTION CLUTCH DEVICE

[75] Inventors: Kohei Ohzono, Fujimi; Tsutomu Hayashi, Hoya, both of Japan

[73] Assignee: Honda Giken Kogyo Kabushiki Kaisha, Tokyo, Japan

[21] Appl. No.: 510,989

[22] Filed: Jul. 5, 1983

[30] Foreign Application Priority Data

Jul. 2, 1982 [JP] Japan .................................. 57-115257
May 14, 1983 [JP] Japan .................................. 58-84813

[51] Int. Cl.$^4$ ...................... F16D 13/42; F16D 25/063
[52] U.S. Cl. ............................. 192/85 AA; 192/89 B; 192/101; 192/103 C; 192/113 B
[58] Field of Search .................... 192/70.12, 70.27, 83, 192/85 AA, 89 B, 101, 113 B, 103 C, 0.096, 0.07

[56] References Cited

U.S. PATENT DOCUMENTS

| | | | |
|---|---|---|---|
| 2,983,346 | 5/1961 | Weymann | 192/0.096 |
| 3,176,813 | 4/1965 | Lee et al. | 192/85 AA |
| 4,077,500 | 3/1978 | Hickman, Sr. et al. | 192/70.12 |

FOREIGN PATENT DOCUMENTS

| | | | |
|---|---|---|---|
| 377083 | 6/1923 | Fed. Rep. of Germany | 192/85 AA |
| 658335 | 4/1979 | U.S.S.R. | 192/85 AA |

*Primary Examiner*—Rodney H. Bonck
*Assistant Examiner*—Alan G. Towner
*Attorney, Agent, or Firm*—Armstrong, Nikaido, Marmelstein & Kubovcik

[57] ABSTRACT

A friction clutch device comprising a clutch spring capable of springing friction plates in a preset direction, a hydraulic device capable of generating oil pressure for likewise pressing said friction plates in said preset direction, and a release device which, when in inoperative conditions, permits the springing force of said clutch spring and the oil pressure of said hydraulic device to act as said pressing force with respect to said friction plates and which, when in operative conditions, effects the discharge of oil pressure from said hydraulic device and the release of the springing force of said clutch spring with respect to said friction plates. With this arrangement, the engaging force of the clutch device is obtained by the sum of the springing force of the clutch spring with respect to a pressure plate and the pressing force by use of oil pressure of the hydraulic device whereas the disengaging position is obtained by the release of the springing force of the clutch spring resulting from the operation of a release mechanism and the release of oil pressure. Thus, it becomes possible to increase the capacity of load while controlling the clutch operating force to the minimal value as needed. In addition, the present device is advantageous because the required engaging force can be secured by the clutch spring even if no oil pressure is present in the source of oil pressure.

7 Claims, 32 Drawing Figures

FRICTION CLUTCH DEVICE

BACKGROUND OF THE INVENTION

1. Field of the Invention

The present invention relates to a friction clutch device used for vehicles principally such as automobiles, motorcycles, etc. which clutch is engaged by applying a pressing force to a friction plate in a fixed direction and disengaged position by releasing the pressing force.

2. Description of the Prior Art

Conventional means for applying pressing force to the friction plate, in the friction clutch device as described above, include the type which uses a spring and the type which uses a hydraulic device. In the former type, to disengage the clutch, a force capable of overcoming the force of the spring is required. If the spring force is increased to increase the load capacity of the clutch device, the force to disengage the clutch becomes heavy. Because of this, this type has a disadvantage in that the disengaging operation cannot be achieved lightly. On the other hand, in the hydraulic type, there is a disadvantage in that when an oil pressure of an oil pressure source is lost, the engaged position of the clutch device cannot be obtained. In such a case, inconveniences occur. For example, when the vehicle is parked, the engine is not effective as a brake. The engine cannot be started by pushing the vehicle.

SUMMARY OF THE INVENTION

It is an object of the present invention to provide a friction clutch device which does not suffer from any of the disadvantages noted above. The friction clutch device of the invention is characterized by a spring capable of springing the friction plate in a fixed direction, a hydraulic device capable of generating oil pressure for likewise pressing said friction plate in said fixed direction, and a release device which, when in inoperative conditions, permits the springing force of said clutch spring and the oil pressure of said hydraulic device to act as pressing force with respect to said friction plate and which, when in operative conditions, effects the discharge of oil pressure from said hydraulic device and the release of the springing force of said clutch spring with respect to said friction plate.

In accordance with the present invention, the engaging force of the clutch device is obtained by the sum of the springing force of the clutch spring with respect to a pressure plate and the pressing force by use of oil pressure of the hydraulic device whereas the disengaging position is obtained by the release of the springing force of the clutch spring resulting from the operation of a release mechanism and the release of oil pressure. Thus, it becomes possible to increase the capacity of load while controlling the clutch operating force to the minimal value as needed. In addition, the present device is advantageous because the required engaging force can be secured by the clutch spring even if no oil pressure is present in the source of oil pressure.

The above and other objects and advantages of the present invention will be fully understood by reading of the following description setting forth a preferred embodiment of the present invention in connection with the attached drawings illustrating the embodiment.

BREIF DESCRIPTION OF THE DRAWINGS

FIGS. 1 to 4 show a first embodiment of the present invention; FIG. 1 being a longitudinal sectional side view of a clutch device for a motorcycle, FIG. 2 being an enlarged view of a circumferential portion of a reed valve in FIG. 1, FIG. 3 being an oil pressure circuit diagram in connection with a hydraulic chamber in FIG. 1, and FIG. 4 being a characteristic curve showing discharge oil pressure of an oil pump in FIG. 3;

Figure 11:
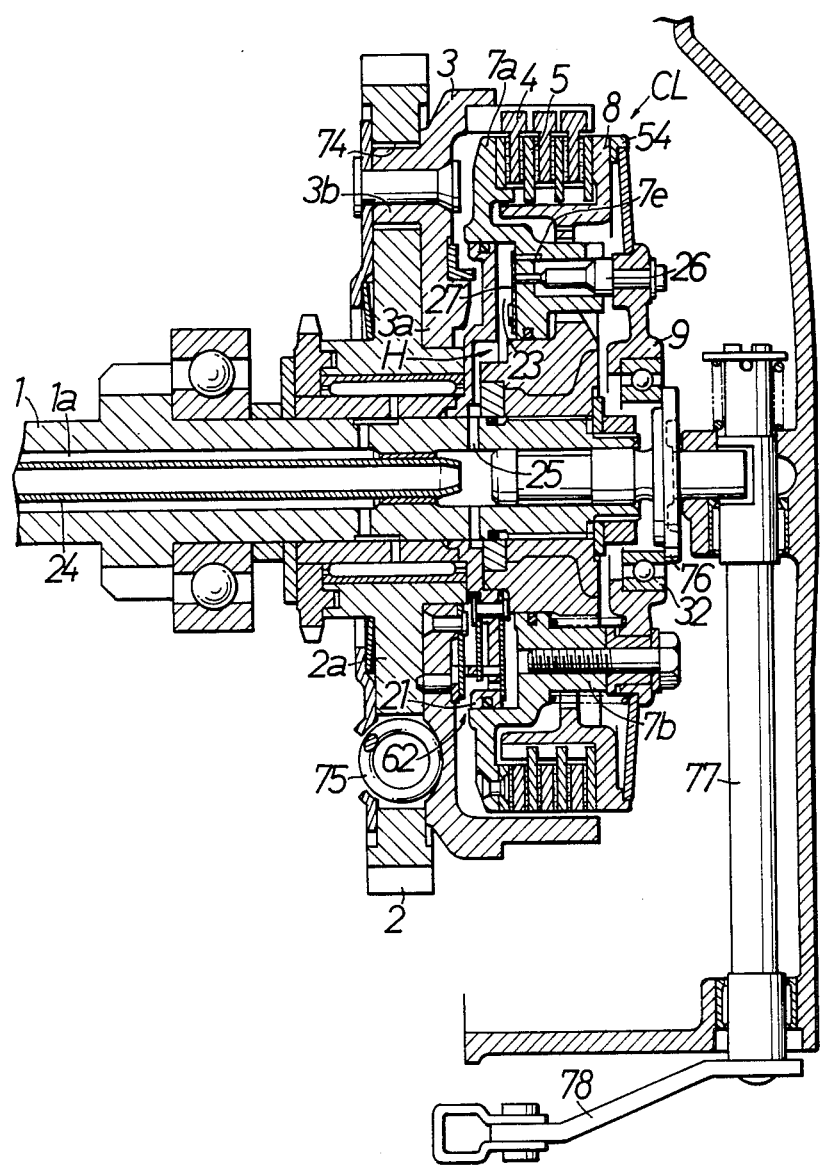
Figure 12:
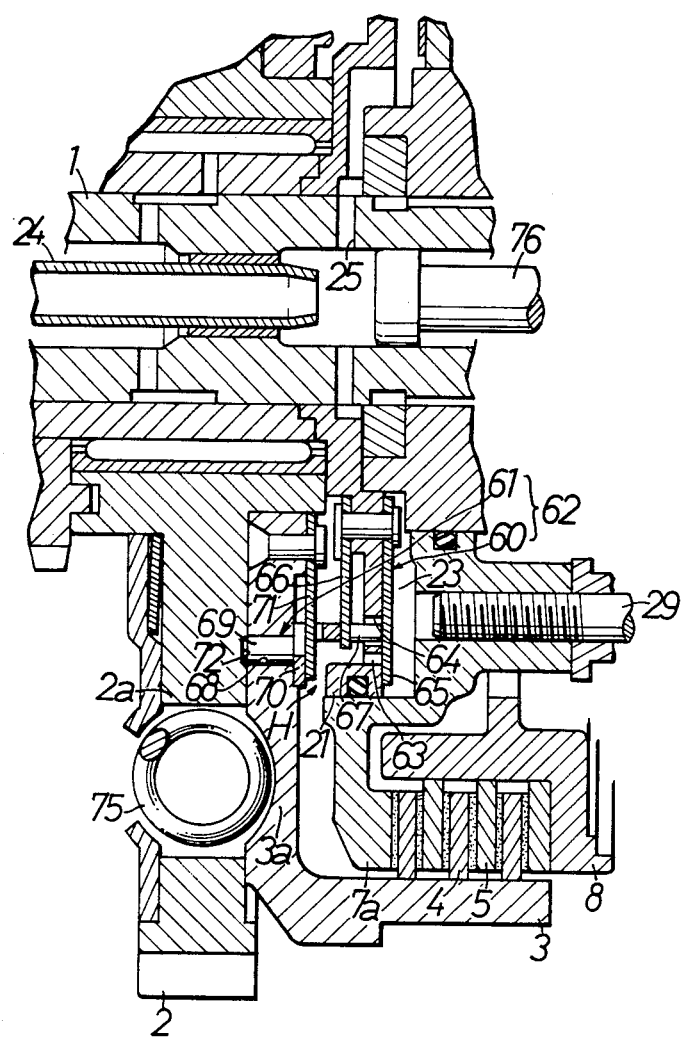
Figure 15A:
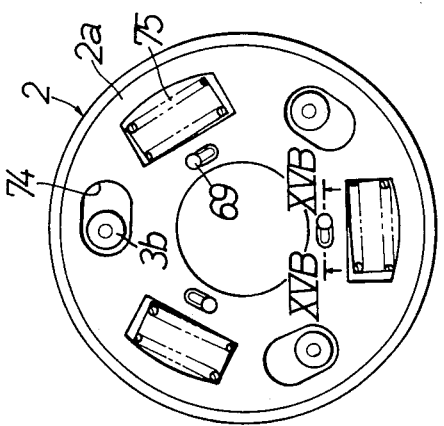
Figure 15B:
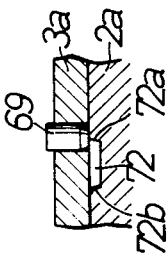
Figure 14A:
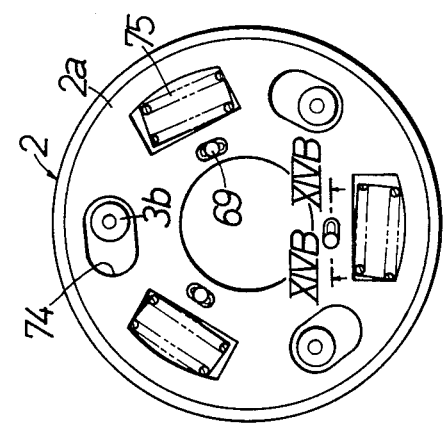
Figure 14B:
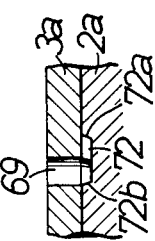
Figure 13A:
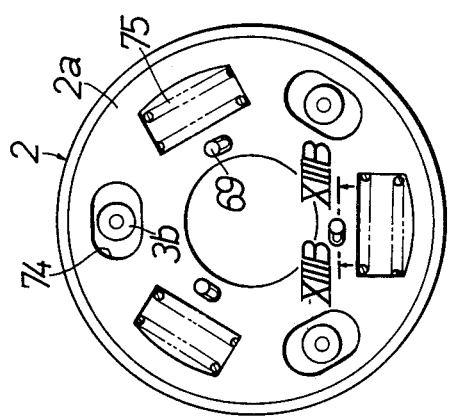
Figure 13B:
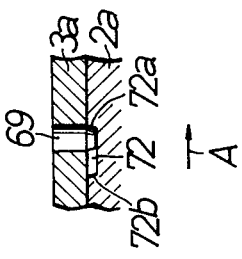
Figure 16:
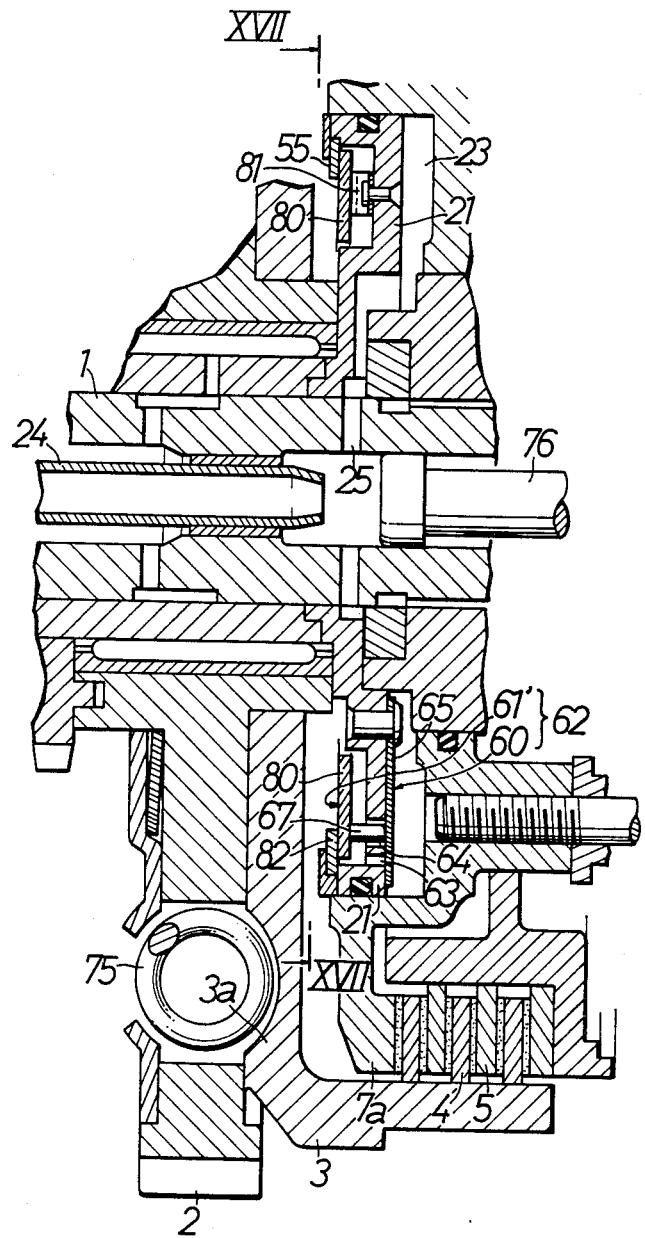
Figure 17:
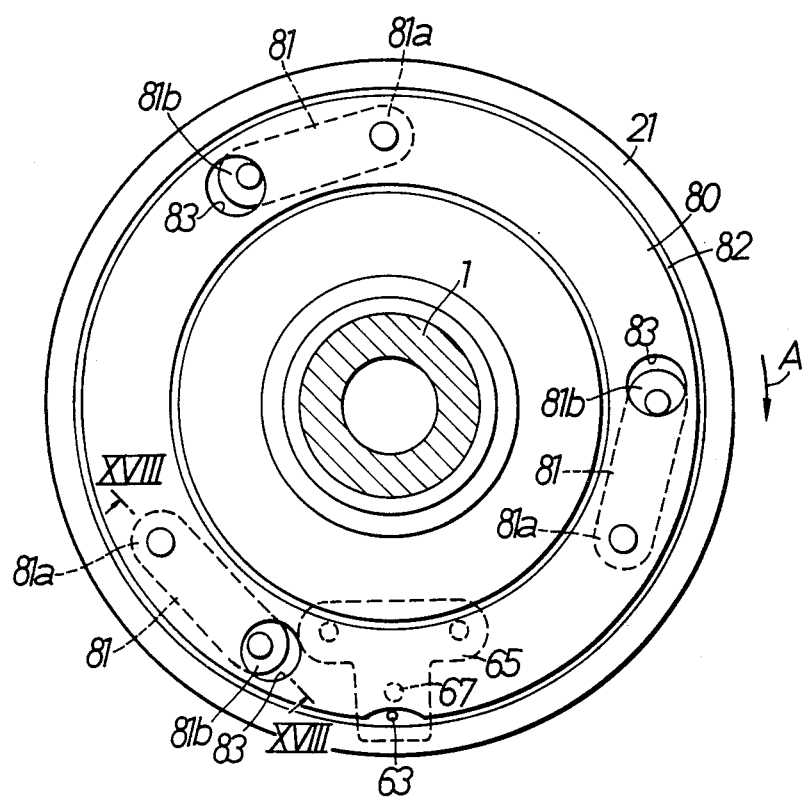
Figure 18:
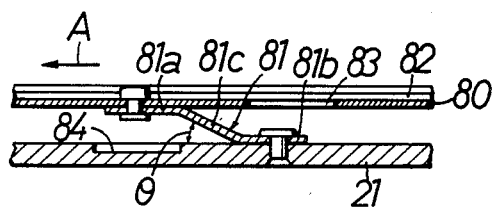
Figure 19:
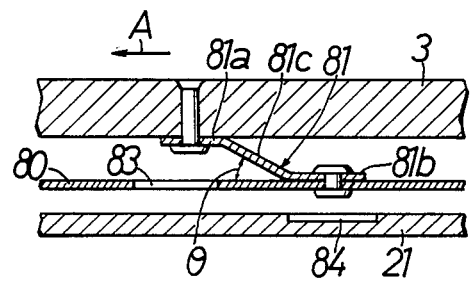
Figure 20:
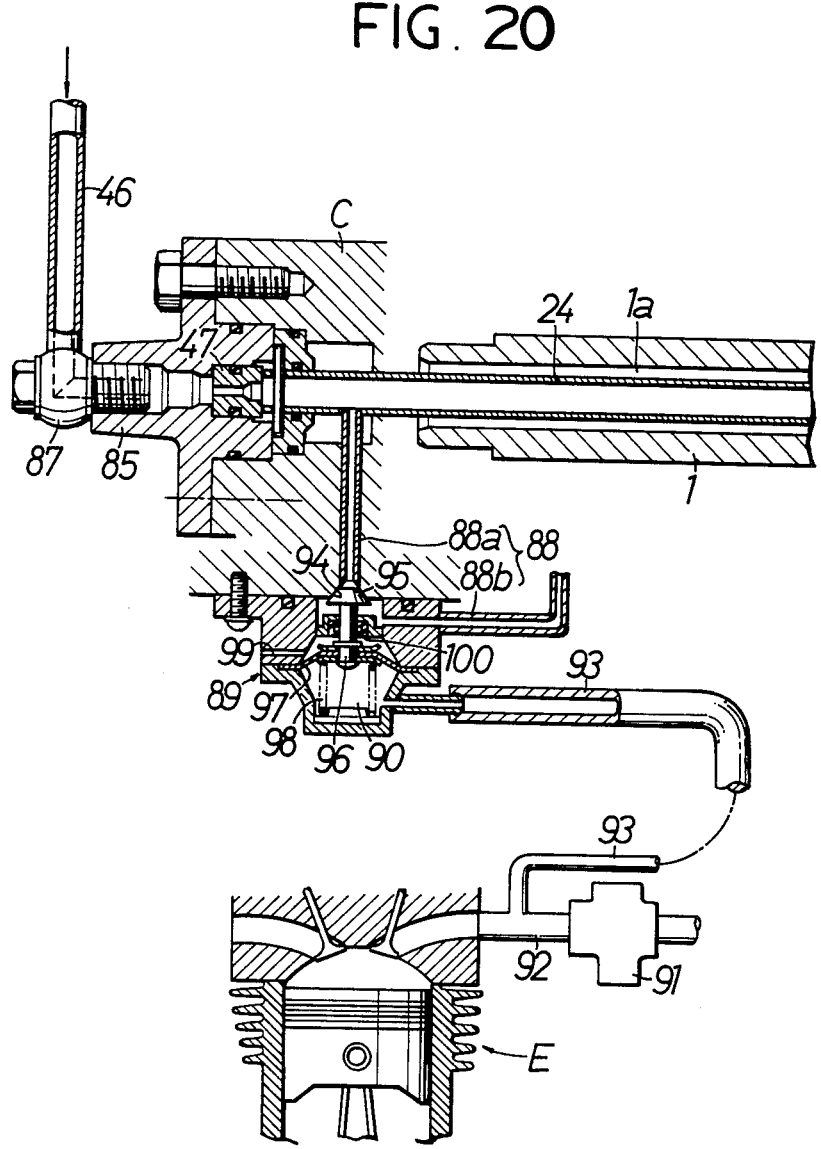
Figure 22:
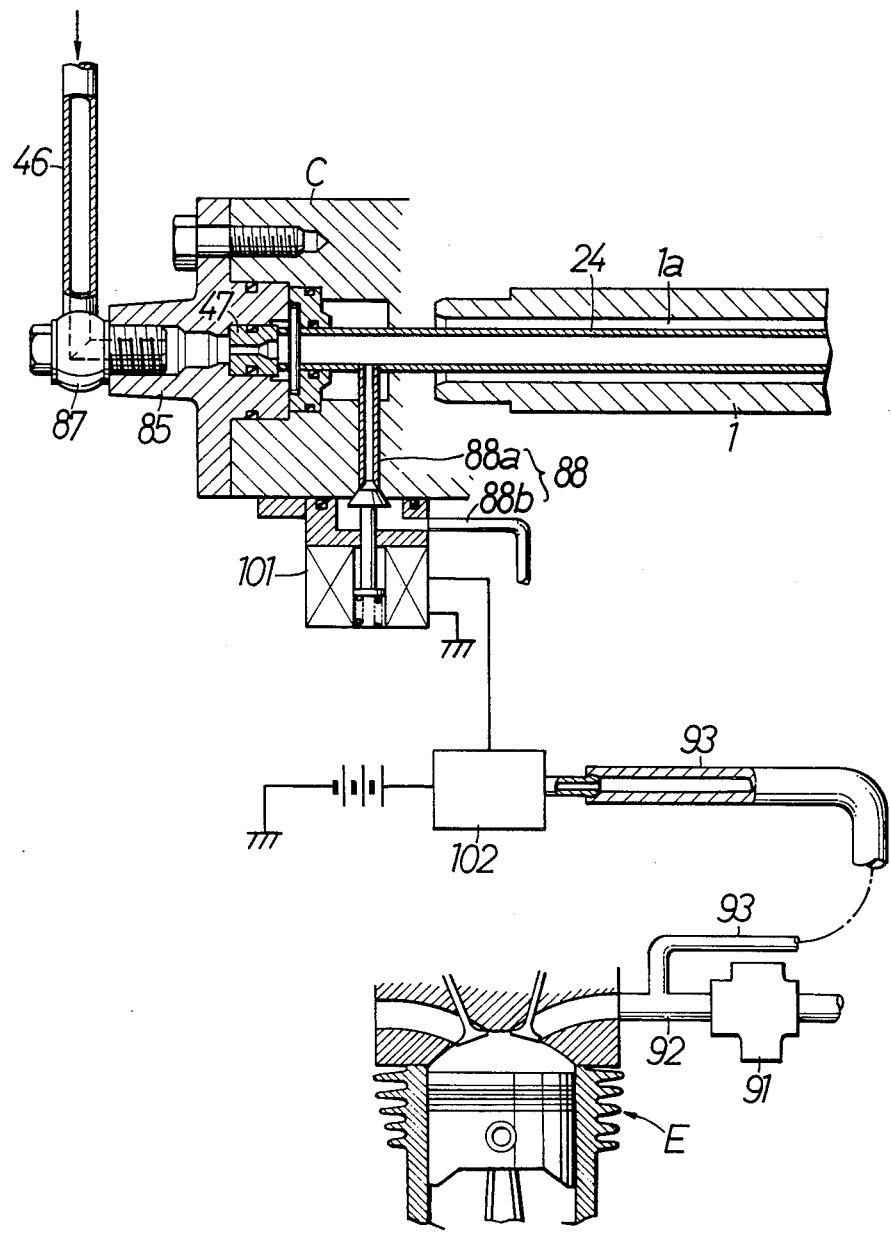

FIGS. 11 to 15B show a fifth embodiment, FIG. 11 being a longitudinal sectional view, FIG. 12 being an enlarged longitudinal sectional view of an essential portion in FIG. 11, FIG. 13A, FIG. 14A and FIG. 15A showing displacements in position between a clutch outer and a driven gear, FIG. 13A being the state at the time of no-load, FIG. 14A being the state at the time of positive load, FIG. 15A being the state at the time of reverse load, FIGS. 13B, 14B and 15B being sectional views taken on line XIIIB—XIIIB, XIVB—XIVB and XVB—XVB of FIGS. 13A, 14B and 15B, respectively;

FIGS. 16 to 18 show a sixth embodiment, FIG. 16 being a longitudinal sectional view of an essential portion, FIG. 17 being a sectional view taken on line XVII-—XVII of FIG. 16, FIG. 18 being a sectional view taken on line XVIII—XVIII of FIG. 17;

FIG. 19 is a sectional view of a seventh embodiment corresponding to FIG. 18;

FIG. 20 is a sectional view of an essential portion of an eighth embodiment;

FIG: 21 is a sectional view corresponding to FIG. 20 at the time of quick reduction in speed;

FIG. 22 is a sectional view of an essential portion of a ninth embodiment; and

Figure 23:
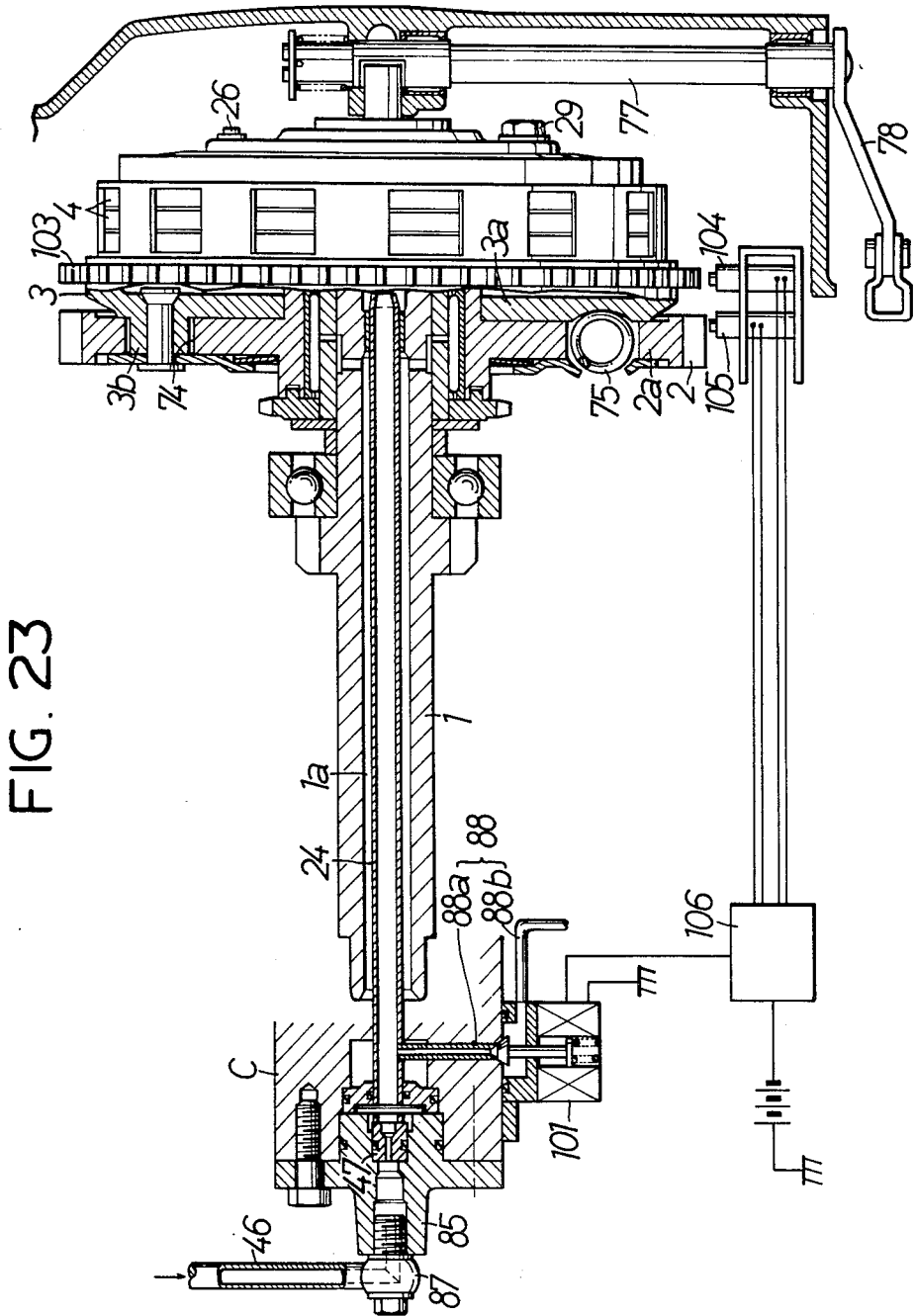
Figure 24A:
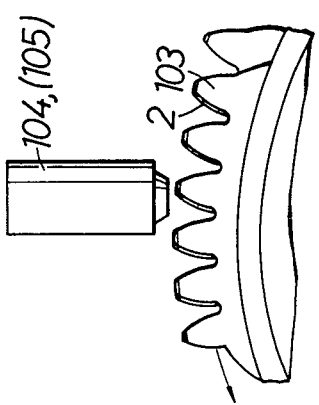
Figure 24B:
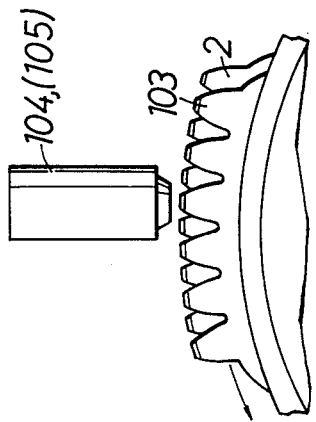
Figure 24C:
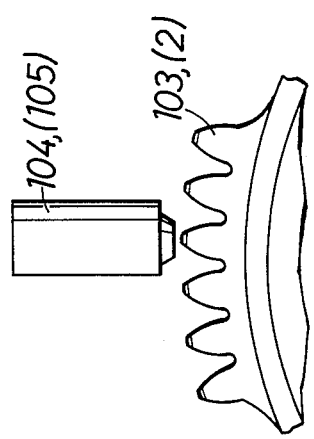
Figure 25A:
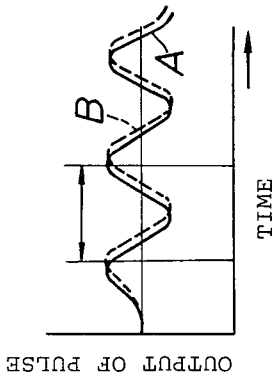
Figure 25B:
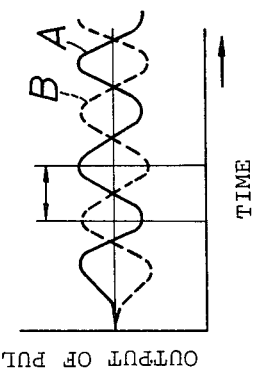
Figure 25C:
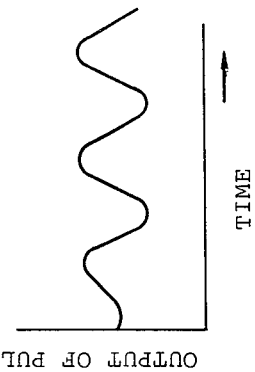

FIGS. 23 to 25C show a tenth embodiment, FIG. 23 being a sectional view of an essential portion, FIGS. 24A, 24B and 24C being side views in the neighbourhood of a pulse sensor while corresponding to each of stages, and FIGS. 25A, 25B and 25C being characteristic curves of output of pulse corresponding to FIGS. 24A, 24B and 24C.

DESCRIPTION OF PREFERRED EMBODIMENTS

In the following, an embodiment in which the present invention is applied to a wet type multiplate friction clutch device for a motorcycle will be described.

Figure 1:
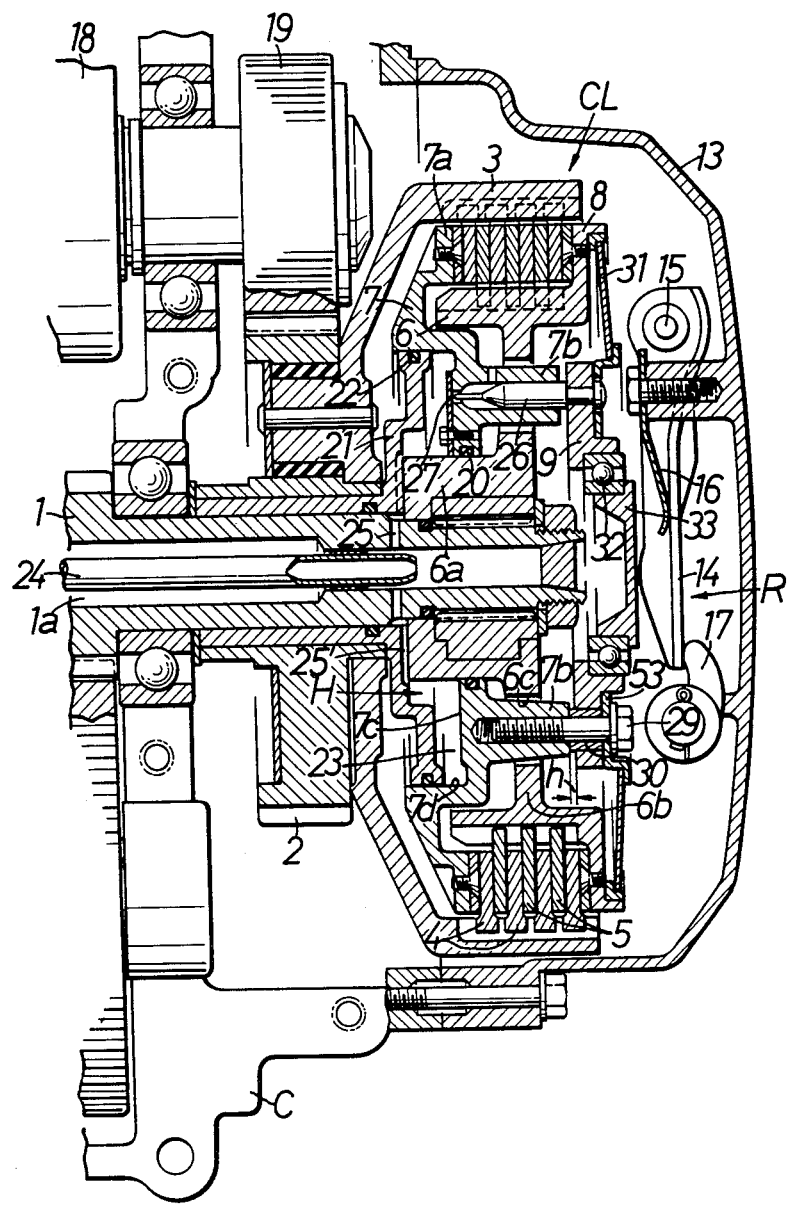

FIGS. 1 to 4 show a first embodiment of the present invention. Referring first to FIG. 1, a crank shaft 18 and a speed change main shaft 1 are supported parallel to each other and rotatably on a crank case C of the engine, and a driven gear 2 meshed with a driving gear 19 secured to the crank shaft 18 is rotatably supported on the speed change main shaft 1. A friction clutch device CL in accordance with the present invention is interposed between the driven gear 2 and the speed change main shaft 1 in the following manner.

A cylindrical bottomed clutch outer housing 3 is connected to one side of the driven gear 2, and a cylindrical clutch inner member 6 coaxially arranged within the clutch outer housing 3 is secured to the speed change main shaft 1. A plurality of driving friction plates 4 are slidably spline-fitted in the inner circumferential surface of the clutch outer housing 3, and a plurality of driven friction plates 5 alternately placed on these driving friction plates 4 one upon another are slidably spline-fitted in the outer circumferential surface of the clutch inner member 6. A pressure receiving plate 8 and a pressure plate 7 are opposedly arranged so as to put the groups of the driving and driven friction plates 4, 5 therebetween from axial opposite sides thereof. The pressure receiving plate 8 is integrally mounted on one end of the clutch inner member 6, and the pressure plate 7 is oil-tightly and slidably supported on a boss 6a of the clutch inner member 6 through an O-ring 20. This pressure plate 7 has an urging portion 7a opposed to one side of the groups of the friction plates 4, 5, a plurality of mounting portions 7b which extend through a through-hole 6c of a web 6b, and a cylindrical portion 7d formed on the side opposite the mounting portion 7b.

In the speed change main shaft 1, an annular piston 21 is fitted and mounted between the clutch outer housing 3 and the clutch inner member 6, and an outer circumferential portion of the piston 21 is oil-tightly and relatively slidably fitted in the inner circumferential surface of the cylindrical portion 7d of the pressure plate 7. In this manner, the boss 6a of the clutch inner member 6, a pressure receiving surface portion 7c of the pressure plate 7, an inner surface of the cylindrical portion 7d and the piston 21 constitute an oil pressure chamber 23.

The speed change main shaft 1 has a hollow portion 1a formed therein for receiving a feed pipe 24 and is bored with a communication port 25. A communication passage 25' is also formed in the end surface of the piston 21. These port and passage 25, 25' serve to feed pressure oil fed from the feed pipe 24 into the oil pressure chamber 23.

One mounting portion 7b of the pressure plate 7 extending through the through-hole 6c of the web 6b of the clutch inner member 6 is hollow, and a control pin 26 is inserted into that hollow portion. The foremost end of this control pin 26 is formed to be narrowed, and the foremost end portion of the control pin 26 can be projected from an escape hole 7e in communication with the interior of the oil pressure chamber 23 into the oil pressure chamber 23 (see an enlarged view of FIG. 2). The escape hole 7e is in communication with a discharge hole 7f which is open to the outer circumferential surface of the mounting portion 7b.

A reed valve 27 for blocking the escape hole 7e is mounted on the pressure receiving surface portion 7c of the pressure plate 7 by means of a bolt 28.

A lifter plate 9 is mounted on the other mounting portion 7b means of a bolt 29 but is mounted through a sleeve 30 so that the lifter plate may be moved axially with respect to the pressure plate 7 through a given clearance h. A spring receiving plate 53 secured to the mounting portion 7b together with the sleeve 30 is disposed adjacent to the outside of the lifter plate 9, and this spring receiving plate 53 is locked at an inner circumferential edge of a clutch spring 31 in the form of a belleville spring whose outer circumferential edge is locked at the pressure receiving plate 8, whereby the pressure plate 7 receives a springing force in a direction of the pressure receiving plate 8 from the clutch spring 31. The control pin 26 is secured to the lifter plate 9. A central member 33 is mounted on the center portion of the lifter plate 9 through a release bearing 32 so that urging of a clutch lever 14 pivotably mounted on a pivot 15 of a clutch cover 13 is received by the central member 33.

An operating lever 17 pivoted on the clutch cover 13 is connected to a free end of the clutch lever 14, said operating lever 17 being associated with a clutch operating lever mounted on a steering handle not shown. That is, when the clutch operating lever is operated, the clutch lever 14 may be pivotally moved towards the central member through the operating lever 17. The clutch lever 14 is urged in a direction of withdrawal from the central member 33 by means of the springing force of a return spring 16 in the form of a plate spring mounted on the clutch cover 13.

With the arrangement as described above, the oil pressure chamber 23 and the feed pipe 24 constitute a hydraulic device H, and the operating lever 17, the clutch lever 14, the central member 33, the release bearing 32, the lifter plate 9, the control pin 26 and the reed valve 27 constitute a release device R.

Figure 3:
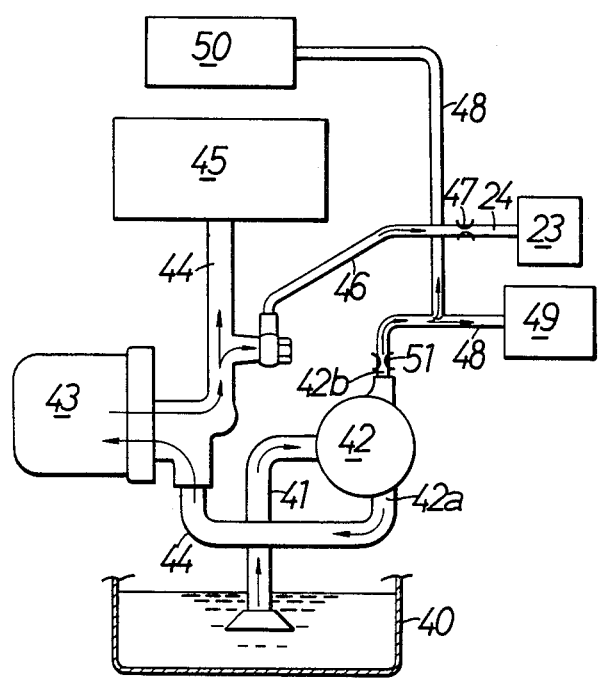

A hydraulic circuit for supplying oil pressure to the oil pressure chamber 23 is shown in FIG. 3. Lubricating oil stored in an oil pan 40 of the engine is pumped up by an oil pump 42 through a suction pipe 41. The oil pump 42 is provided with a pair of large and small discharge ports 42a, 42b, and pressure oil discharged from the large discharge port 42a is supplied to a lubricating portion 45 in a crank shaft system via a main oil passage 44 provided with an oil filter 43.

A branch oil passage 46 in communication with the feed pipe 24 extends from the main oil passage 44 at a downstream from of the oil filter 43, and a part of pressure oil passing through the main oil passage 44 is supplied to the oil pressure chamber 23 of the clutch device CL via the branch oil passage 46 and the feed pipe 24. An orifice 47 is provided at an inlet of the feed pipe 24 in order to control a quantity of oil supplied to the oil pressure chamber 23.

Pressure oil discharged from the small discharge port 42b is supplied to a lubricating portion 49 of a speed change gear and to a lubricating portion 50 of a dynamic valve mechanism through an auxiliary oil passage 48 whose downstream is branched into two passages. An orifice 51 is provided at an inlet of the auxiliary oil passage 48 in order to control a quantity of pressure oil.

Next, the operation of the above-described embodiment will be described hereinafter.

A part of pressure oil discharged from the large discharge port 42a is normally supplied to the oil pressure chamber 23 of the clutch device CL by the operation of the oil pump 42 during the operation of the engine as previously described. Assuming now that the clutch lever 14 is in a retracted position distanced from the central member 33, the lifter plate 9 is biased axially outwardly by means of the clutch spring 31, a clearance through the clearance h is formed between the inner surface of the lifter plate 9 and the end of the mounting portion 7b of the pressure plate 7, and the escape hole 7e of the pressure plate 7 is blocked by the reed valve 27. Thus, the pressure oil supplied to the oil pressure chamber 23 is not leaked outside to thereby increase pressure in the chamber 23. Upon receipt of said pressure, the pressure plate 7 causes the groups of friction plates 4, 5 to press against the pressure receiving plate 8. Also, the springing force of the clutch spring 31 acts as the pressing force on the pressure plate 7 towards the pressure receiving plate 8 through the lifter plate 9 and the bolt 29, and these pressing forces are added to impart a great friction force between both the friction plates 4 and 5 whereby the clutch device CL assumes the engaged state. Accordingly, rotary torque of the crank shaft of the engine is successively transmitted to the driving gear 19, the driven gear 2, the clutch outer housing 3, the driving friction plate 4, the driven friction plate 5, the clutch inner member 6 the speed change main shaft 1.

Next, when the clutch lever 14 is rotated clockwise in FIG. 1 about the pivot 15 through the operating lever 17 by the operation of the clutch operating lever not shown, the control pin 26 pushes the reed valve 27 to open the escape hole 7e, during a process wherein the lifter plate 9 moves forward on the sleeve 30 through a stroke corresponding to the clearance h, thus discharging the pressure oil within the oil pressure chamber 23 outside from the discharge hole 7f. Therefore, the quantity of oil supplied is controlled by the orifice 47 and the oil pressure chamber 23 is reduced in pressure to release the pressing force against the pressure plate 7 by oil pressure. Thus, in this stage, only the springing force of the clutch spring 31 remains for the pressing force against the groups of friction plates 4, 5, and hence, the friction force between both the friction plates 4, 5 decreases whereby the clutch device CL assumes so-called semi-clutch state.

When the lifter plate 9 is further moved forward, the lifter plate 9 causes the pressure plate 7 to be displaced in a direction away from the pressure receiving plate 8 against the springing force of the clutch spring 31 to fully release the pressing force from both the groups of friction plates 4, 5 whereby the clutch device CL assumes the disengaged condition. Thus, the transmission of torque from the crank shaft 18 to the speed change main shaft 1 is cut off.

Under the semi-clutch condition and disengaged condition of the clutch device CL, the oil discharged from the discharge hole 7f flows passing between both the friction plates 4, 5 and serves as oil for cooling both the friction plates 4, 5. Accordingly, the rate of absorption of energies of the driving and driven friction plates 4, 5 increases and the durability enhances. It is noted that the reed valve 27 also possesses the function of a control valve for said cooling oil.

In the above-described disengaging operation, the operating force of the clutch operating lever will merely suffice to overcome the springing force of the clutch spring 31 to advance the lifter plate 9 and therefore, the clutch operation can be lightly accomplished. It is further noted that the force required by the control pin 26 to open the reed valve 27 is extremely small which can be almost disregarded.

Moreover, since the friction force, that is, the engaging force between both the friction plates 4, 5 is obtained by the sum of the pressing force by oil pressure and the pressing force by the clutch spring 31, if the oil pressure and a pressure receiving area are selected, the capacity of load of the clutch device CL can be freely set in magnitude without influencing on the clutch operating force.

Furthermore, since the control pin 26 is directly mounted on the lifter plate 9 and since the clutch spring 31 and oil pressure are controlled almost at the same time by controlling the lifter plate 9, the stroke can be felt by hands during the engaging and disengaging operation of the clutch and in addition, feeling of moderation of engagement and disengagement of the clutch can be obtained. It is possible to secure feeling of clutch operation.

In addition, since the operation for the valve for controlling oil pressure, that is, the reed valve 27 and the clutch spring 31 is accomplished by the operation of the lifter plate 9, an oil pressure piping required for control of oil pressure can be minimized to attain simplification of a valve system and to render the construction simple.

Further, when the engine is stopped, no oil pressure force is present, but even in this condition, the pressing force against both the friction plates 4, 5 remains because the springing force of the clutch spring 31 is present and the required engaging force can be secured. Thus, if the low speed gear of the speed change gear is set to the operative condition when the vehicle is parked, the engine brake action is obtained to prevent reckless running of the vehicle, and even when the starting motor is inoperable, the push forward starting of the engine can be made.

Figure 4:
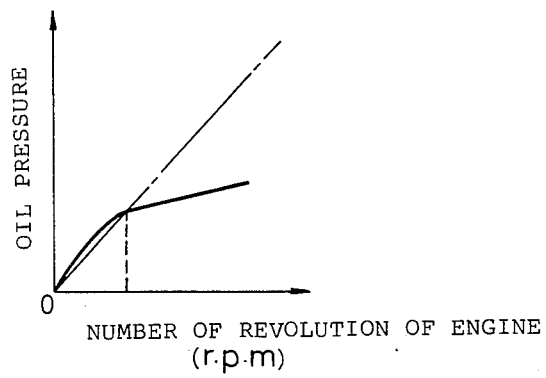

The engine is generally used as a driving source of the oil pump 42, and the characteristic of the discharge oil pressure of the pump 42 is normally changed as shown in FIG. 4, which can be used as a variable capacity clutch utilizing said oil pressure characteristic.

Furthermore, the clutch spring 31 in the present invention is not provided to provide a main clutch engaging force by the springing force thereof, and therefore, freedom of setting the strength of the clutch spring 31 is great. Therefore, freedom of selecting the lever ratio of various levers in the clutch operating system is great and thus the design of shapes and dimensions thereofor are easily accomplished.

In addition, a throttling degree of the orifice 47 in the pressure oil feeding system can be selected to control clutch engaging time, and therefore, quick engagement of the clutch and prevention of judder can be easily accomplished.

While in the illustrated embodiment, the reed valve 27 has been used as a release valve which is made to release pressure oil within the oil pressure chamber 23, it should be noted that the release valve is not limited to said reed valve but other valves such as a ball valve can be used.

It should be further noted that means for opening and closing the release valve is not limited to the axially elongated control pin 26 secured to the lifter plate 9 as in the illustrated embodiment but means will suffice which can open the release valve in response to movement of the lifter plate 9.

While in the illustrated embodiment, the oil pressure chamber 23 is composed of the clutch inner member 6, the pressure plate 7 and the piston 21, it should be noted that the chamber is not limited thereto but an oil pressure chamber will suffice which for example, has a surface to which the pressure plate 7 is substantially perpendicular in an axial direction, said surface (the pressure receiving surface 7c) forming a part of a wall of the chamber to form an oiltight chamber.

Figure 2:
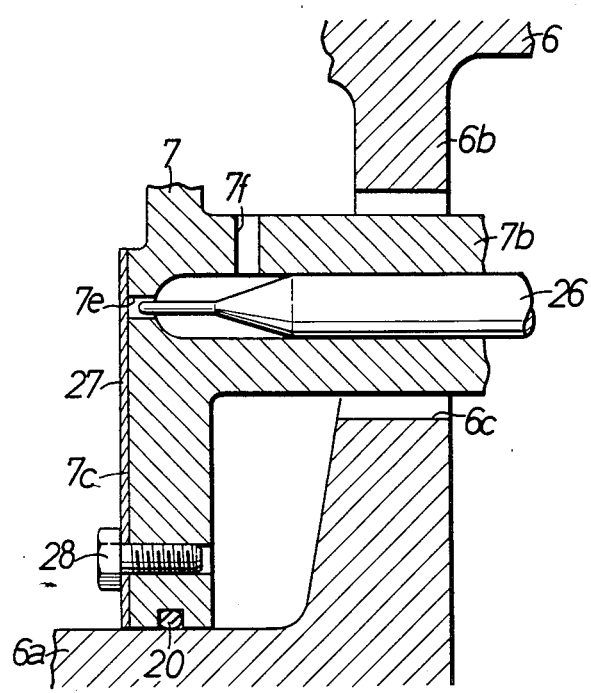

Incidentally, feeding of oil to the groups of friction plates 4, 5 is required to achieve cooling and stabilize the coefficient of friction. Generally speaking, a large feed amount of oil is advantageous but if the feed amount of oil is excessively large, dragging torque due to viscosity of oil increases. It is therefore desired that an optimum feed amount of oil is selected in consideration of both cooling effect and reduction in dragging torque. However, if the discharge hole 7f is arranged inwardly of the web 6b of the clutch inner 6 as shown in FIG. 2, the oil discharged from the oil pressure chamber 23 via the discharge hole 7f tends to be supplied in large amount directly to the groups of friction plates 4, 5, and in addition, the discharge of unnecessary oil in excess of normal amount cannot be accomplished smoothly.

In view of the foregoing, an arrangement of a second embodiment will now be described in which the amount of oil which is discharged from the oil pressure chamber 23 and supplied to the groups of friction plates 4, 5 can be set to the optimum value to obtain cooling effect and reduction in dragging torque.

Figure 5:
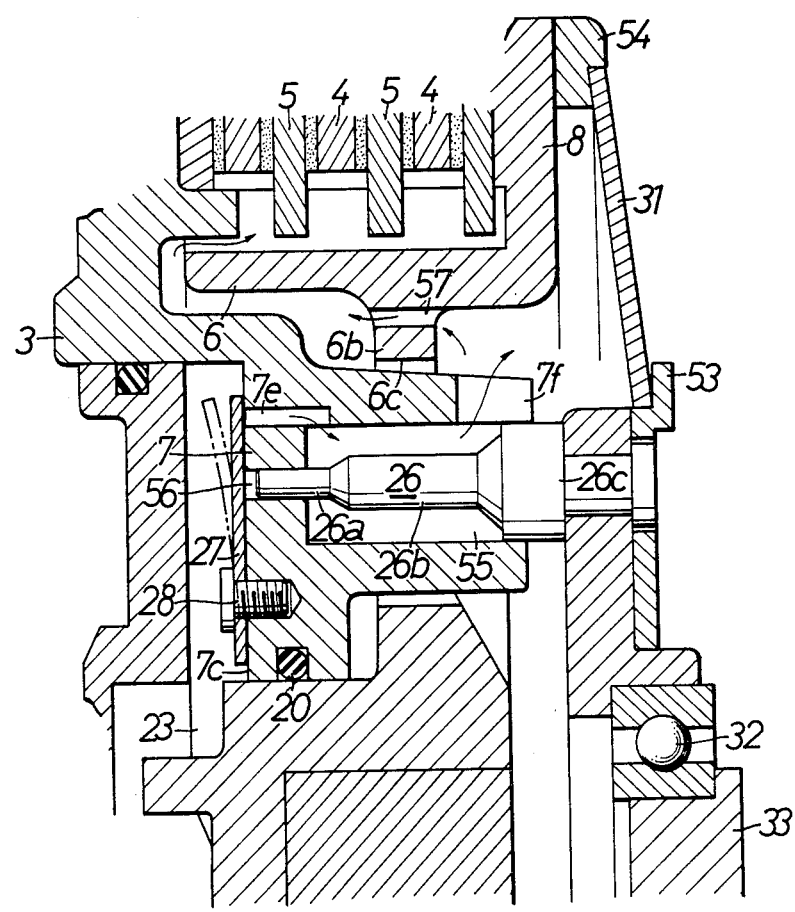
FIG. 5 is a longitudinal sectional view showing an essential portion of a second embodiment.

FIG. 5 shows a second embodiment. An intermediate portion 26b of the control pin 26 has a diameter so that an annular flowpassage 55 may be formed between it and an inner surface of a hollow portion of the mounting portion 7b, a foremost end 26a having a diameter so that the former may be fitted in a hole 56 bored in the pressure receiving surface 7c of the pressure plate 7, and a base portion 26c having a diameter so that the former may be fitted in the hollow portion of said mounting portion 7b.

The pressure receiving portion 7c of the pressure plate 7 is bored with an escape hole 7e, through which the oil pressure chamber 23 is brought into communication with the hollow portion of the mounting portion 7b, corresponding to the end of the reed valve 27. Also, the foremost end of the mounting portion 7b is bored with a discharge hole 7f through which the flowpassage 55 is brought into communication with the exterior. With this, the discharge hole 7f is positioned externally of the web 6b of the clutch inner member 6. A communication hole 57 is bored in a position outwardly of the through-hole 6c in the web 6b. Further, a portion which supports the clutch spring 31 of the clutch outer housing 3 is bored with a leak groove 54 to permit oil to escape outside.

With this arrangement, the oil discharged outwardly of the web 6b of the clutch inner member 6 from the oil pressure chamber 23 partly flows into the web 6b of the clutch inner member 6 through the communication hole 57, and is supplied to the friction plates 4, 5 to cool the friction plates 4, 5 and stabilize the coefficient of friction. In this embodiment, the oil is not directly discharged inwardly (that is, on the side of the friction plates 4, 5) of the web 6b of the clutch inner member 6 but once flows outwardly of the web 6b as previously mentioned, after which the oil is partly introduced towards the friction plates 4, 5. Therefore, the excessively large amount of oil is not supplied to the friction plates 4, 5, and even if the excessively large amount of oil is supplied, such surplus oil is easily discharged outwardly of the web 6b whereby the feed amount of oil to the friction plates 4, 5 is properly maintained. That is, an increase in dragging torque resulting from viscosity of oil because of excessively large feed amount of oil is avoided and the feed amount of oil required for cooling is maintained.

In FIG. 5, it is noted that the foremost end 6a of the control pin 26 is made to have a small diameter as shown in FIG. 2, and the hole 56 can be used as the escape hole 7e. It is further noted that the communication hole 57 is omitted, and the annular clearance between the through hole 6c and the mounting portion 6b can be substituted for the communication hole 57.

In the embodiment shown in FIG. 1, the lifter plate 9 is designed so that the former may be moved axially through a given clearance h with respect to the pressure plate 7. Thus, the positional relation between the lifter plate 9 and the pressure plate 7 is indefinite unless other conditions for locating are added to both the lifter plate 9 and pressure plate 7, and therefore, timing of starting clutch engagement at the time of clutch engaging operation does not accurately correspond to the stroke of clutch operation. That is, in the range wherein transmitted torque is controlled by oil pressure, at the time of operating clutch engagement, the clearance between the pressure plate 7 and the lifter plate 9 is zero until the pressure plate 7 comes into contact with the friction plates 4, 5 in FIG. 1, and therefore, the opening degree of the reed valve 27 is not changed. Operation of closing the reed valve 27 commences after the pressure plate 7 have contacted with the friction plates 4, 5. However, pressure within the oil pressure chamber 23 is not changed immediately even if the reed valve 27 begins to close, and oil pressure begins to increase after the control pin 26 has been retracted through a certain allowable stroke and then closed to some extent. However, even if the clutch lever 14 is further moved outwardly after the pressure plate 7 has contacted with the friction plates 4, 5, the control pin 26 and the pressure plate 7 are merely urged to be moved outwardly by oil pressure within the oil pressure chamber 23 and do not follow accurately the movement of the clutch lever 14. Because of this, a start point at which oil pressure acts (a start point of clutch engagement by oil pressure) is not fixed and the clutch engagement does not exactaly correspond to the stroke of clutch operation.

In view of the foregoing, a third embodiment will be described hereinafter to overcome such disadvantages as noted above.

Figure 6:
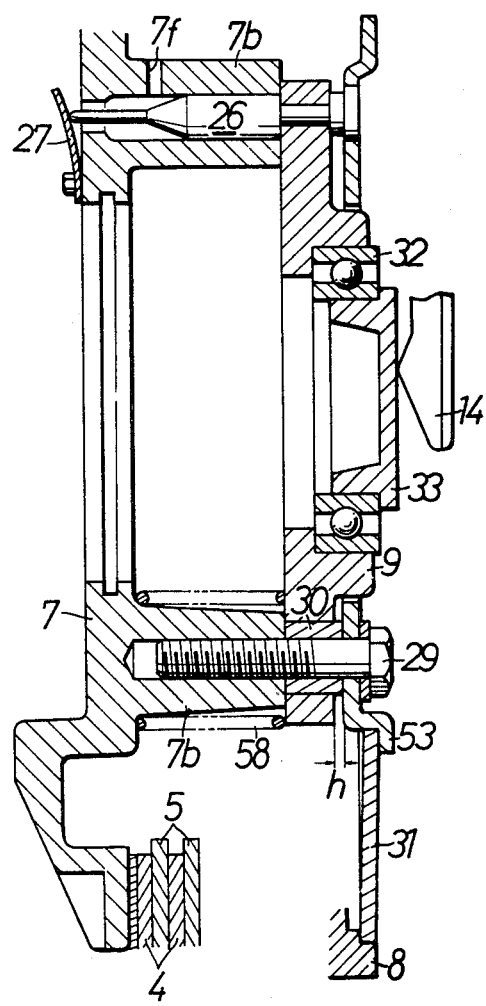
FIG. 6 is a longitudinal sectional view showing an essential portion of a third embodiment.

FIG. 6 shows a third embodiment. A control spring 58 is interposed between the pressure plate 7 and the lifter plate 9 surrounding the mounting portion 7b of the pressure plate 7. This control spring 58 has a relatively weak spring force as compared with the clutch spring 31 to bias the the pressure plate 7 and the lifter plate 9 in a direction of moving away from each other. FIG. 6 shows the condition wherein the clutch is disengaged.

In accordance with the above-described structure, in the case the clutch engagement is achieved from the clutch disengaged condition, when the clutch lever 14 is operated outwardly, the pressure plate 7 and the lifter plate 9 are moved outwardly while keeping the clearance therebetween at zero until the pressure plate 7 comes into contact with the friction plates 4, 5. When the pressure plate 7 comes into contact with the friction plates 4, 5, the load of the clutch spring 31 is caused to act whereby power transmission through the load of the clutch spring is effected. In this stage, the reed valve 27 remains opened under the condition of FIG. 6. When the clutch lever 14 is further moved outwardly after the pressure plate 7 has contacted with the friction plates 4, 5, the lifter plate 9 is urged by the control spring 58, which is arranged between the pressure plate 7 and the lifter plate 9, and moved outwardly accurately following the clutch lever 14. That is, the lifter plate 9 is outwardly moved through the clearance h on the opposite side from the position where the clearance is zero in FIG. 6 with respect to the pressure plate 7, and thus the reed valve 27 is closed as the control pin 26 retracts. In this manner, the reed valve 27 accurately follows the movement of the clutch lever 14 and thus, timing of controlling oil pressure is fixed and the clutch engagement is accomplished properly corresponding to the stroke of clutch operation.

Figure 7:
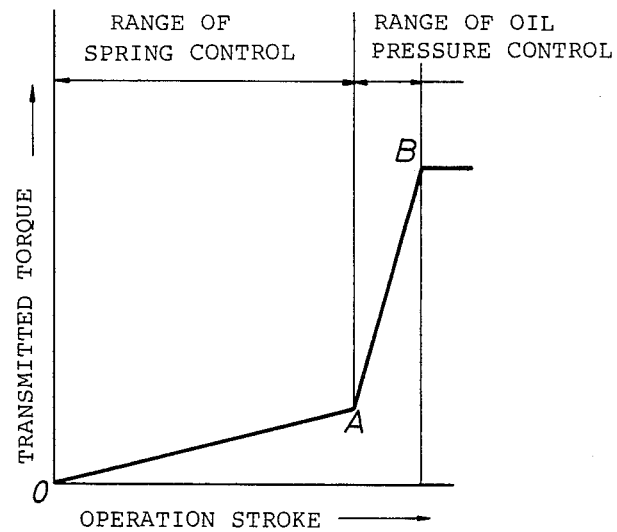
FIG. 7 is a view showing the relation between the operation stroke and the transmitted torque in the first embodiment.

FIG. 7 shows the relationship between the transmitted torque of clutch and the operation stroke of clutch (the relationship between the load of the pressure plate 7 and the operation stroke of clutch). As shown in FIG. 7, the slope AB of the range of oil pressure control is extremely greater than the slope OA of the range of spring control.

In the clutch having a construction of this kind in which transmission is effected by pressing the friction plates 4, 5 by the pressure plate 7, the magnitude of the transmitted torque is determined by the magnitude of the load in a direction of pressing (axially outwardly) the friction plates 4, 5 applied to the pressure plate 7, and therefore, controllability of clutch operation (that is, readiness of adjustment of transmitted torque) varies with the corresponding relation between the operation stroke of clutch and the load acting on the pressure plate 7. However, since a difference between the slope OA and the slope OB in FIG. 7 is great and the controllability before and behind the point A has a great difference therebetween, because of which smoothness in the clutch engagement is somewhat impaired and operation feeling is not good.

Figure 8:
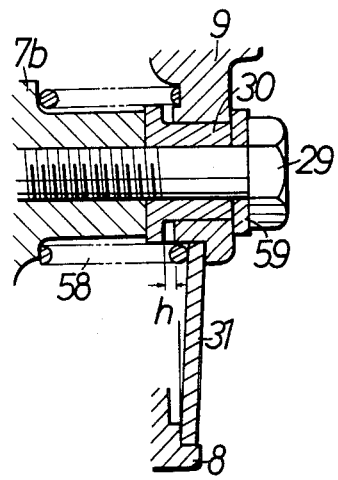
FIGS. 8 and 9 are respectively longitudinal sectional views of an essential portion for explanation of the operating conditions of a fourth embodiment.

FIG. 8 is a sectional view of an essential part in a fourth embodiment that may solve these difficulties noted above. The clutch spring 31 is directly engaged with the lifter plate 9.

Figure 9:
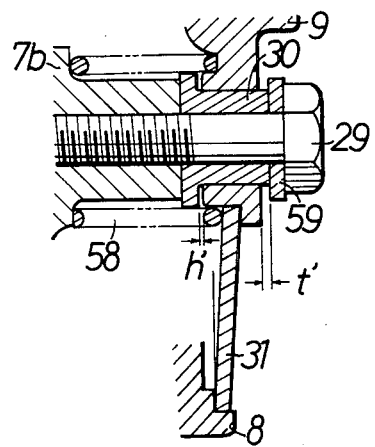

With this arrangement, under the condition of clutch disengagement, the pressure plate 7 remains stabilized in a position where a force biased leftwards against the lifter plate 9 by the control spring 58 and a force pressed rightwards by some pressure remained in the oil pressure chamber 23 though the reed valve 27 is open are balanced, that is, in a position of a certain small clearance h', as shown in FIG. 9. As just mentioned, the control spring 58 is functioned to establish the positional relation between the pressure plate 7 and the lifter plate 9 under the condition of the clutch disengagement to eliminate a displacement of point at the time of clutch engaging operation.

When the condition is again changed from the clutch disengagement of FIG. 9 to the clutch engagement, the lifter plate 9 is moved outwardly by the force of the clutch spring 31, and during the movement thereof through a clearance t' on the side of a washer 9 disposed on the outward end of the sleeve 30, the escape hole 7e is blocked by the reed valve 27 to create pressure within the oil pressure chamber 23 to cause oil pressure to act on the pressure plate 7. After the lifter plate 9 has moved through said clearance t' into contact with the washer 51, the force by the clutch spring 31 is caused to act on the pressure plate 7 so as to assume a condition wherein both pressing force by oil pressure and pressing force by clutch spring 31 act.

Figure 10:
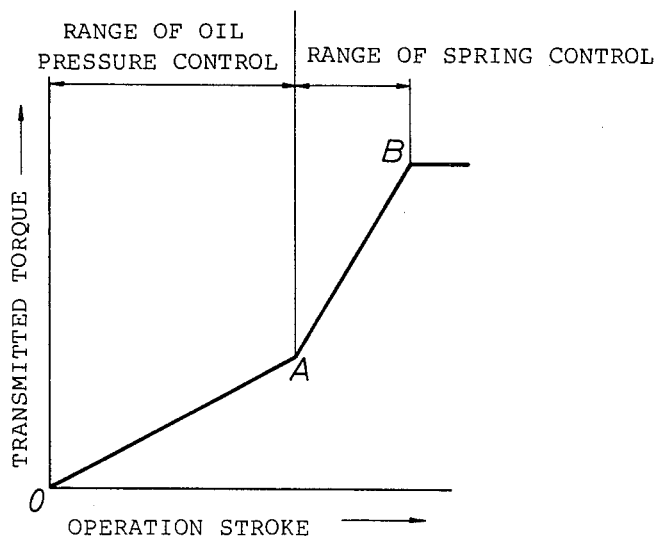
FIG. 10 is a view showing the relation between the operation stroke and the transmitted torque in the fourth embodiment.

From the above-described operation, the relation between transmitted torque and operation stroke of clutch is as shown in FIG. 10. The stage OA at the beginning of operation stroke is the range of oil pressure control and the latter stage AB is the range of spring control under the condition wherein oil pressure is exerted.

Normally, the load by oil pressure is set sufficiently greater than the load by the clutch spring 31. Therefore, assuming that setting is made as just mentioned also in this embodiment, the slope of the range OA of oil pressure control in FIG. 10 is greater than the slope of the range OA of spring control in FIG. 7 showing the characteristic of the first embodiment. Accordingly, the difference between OA and OB in FIG. 10 is smaller than the difference in slope between OA and OB in FIG. 7 and the difference in controllability before and behind the point A, and therefore, adjustment of transmitted torque in the clutch engaging operation is easily made, clutch engaging is smoothly carried out and operation feeling thereof is good.

Assuming now that conversely to the fourth embodiment, the load by the clutch spring 31 is set greater than the load by oil pressure, the slope of the range OA of spring control in the first embodiment shown in FIG. 1 is greater than the slope of the range OA of oil pressure control in the construction of the fourth embodiment of FIG. 8 and the characteristic between transmitted torque and operation stroke is reversed. Accordingly, depending on the magnitude of the load by the clutch spring and the load by oil pressure, if the former is great, the construction of the first embodiment is selected whereas if the latter is great, the construction of the embodiment in FIG. 8 is selected.

FIG. 11 is a sectional view of a fifth embodiment. Parts corresponding to those in the embodiments of FIGS. 1 to 10 are indicated by like reference numerals. A protruded portion 3b is protruded on the side of the driven gear 2 from the end wall 3a of the clutch outer housing 3, and said protruded portion 3b is inserted into a circumferentially elongated hole 74 bored in the web 2a of the driven gear 2, as a consequence of which the clutch outer housing 3 is relatively rotated through a small angle with respect to the driven gear 2. The clutch outer housing 3 and the driven gear 2 are resiliently connected through a damper spring 75. By such a connecting construction of both elements, torque variation on the engine side is relieved.

The lifter plate 9 is designed so that the former is associated with the clutch lever through a lifter piece 76, a cam shaft 77, an arm 78 and a clutch wire not shown.

To permit working oil in the oil pressure chamber 23 to leak to reduce pressure, a pressure reducing device 62 comprising a valve section 60 and an operating section 61 is further provided in association with the hydraulic device H, as shown in an enlarged scale in FIG. 12, in addition to an oil pressure release mechanism which uses the above-mentioned reed valve 27, the control pin 26 and the like.

The valve section 60 is composed of a leak hole 63 and an operating hole 64 which axially extend through the piston 21 to bring the oil pressure chamber 23 into communication with the side of the clutch outer 3, a reed valve 65 for blocking these leak hole 63 and operating hole 64 from the side of the oil pressure chamber 23, a plate-like supporting spring 66 secured on the side of the clutch outer housing 3 of said piston 21, and a push pin 67 supported in a position corresponding to the operating hole 64 by means of said supporting spring 66 and which pushes open the reed valve 65 when a pressing force directed rightwardly in FIG. 12 acts on the supporting spring 66.

The operating section 61 is composed of a through-hole 68 which extends through the end wall 3a of the clutch outer housing 3 in an axial direction of a transmission shaft, a cam pin 69 slidably inserted into said through-hole 68 and which foremost end on the side of the driven gear 2 is chamfered, a ring-like operating element 70 interposed between said cam pin 69 and said supporting spring 66 in such a way that said element is in contact with both the pin and spring, a keep spring 71 for biasing the cam pin 69 against the driven gear 2 through the operating element 70 to bring the foremost end of the cam pin 69 into abutment with the web 2a of the driven gear 2, and a cam groove 72 formed in the web 2a in abutment with the cam pin 69 in such a way that when a circumferential displacement occurs between the driven gear 2 and the clutch outer housing 3, the cam pin 69 is moved towards the piston 21. The cam groove 72 is designed so that when load is not present, an inclined surface 72a on the side in a direction (indicated at arrow A) wherein driving torque of the engine acts on the driven gear 2 comes into abutment with the chamfered portion of the foremost end of the cam pin 69 whereas an inclined surface 72b in a direction opposite the arrow A is moved away from the cam pin 69 through a suitable distance, as shown in FIGS. 13A and 13B. Said suitable distance is the distance to the extent that in the case the positive load (the driving torque of the engine) acts on the driven gear 2 and a circumferential displacement occurs between the driven gear 2 and the clutch outer housing 3 due to the variation in torque, the inclined surface 72b does not contact with the cam pin 69 as shown in FIGS. 14A and 14B.

With formation of the cam groove 72 as described above, the loads (reverse loads) act on the rear wheels from the road surface due to sudden deceleration, said reverse load is transmitted by the clutch device CL and the displacement between the driven gear 2 and the clutch outer housing 3 occurs, then the cam pin 69 is forced out by the inclined surface 72a against the keep spring 71 as shown in FIGS. 15A and 15B, the supporting spring 66 is subjected to the pressing force through the operating element 70, the reed valve 65 is pushed open by the push pin 67, and working oil in the oil pressure chamber 23 leaks through the leak hole 63. In other words, when the reverse load is exerted, the operating section 61 is actuated by the positional displacement between the driven gear 2 and the clutch outer housing 3, the reed valve 65 is opened by the cam pin 69 of the operating section 61, and pressure in the oil pressure chamber 23 is reduced. The torque capacity of the clutch device CL is decreased by said reduction in pressure and the shock force when the reverse load is exerted is relieved.

On the other hand, when the reverse load is not exerted and the displacement between the driven gear 2 and the clutch outer housing 3 is returned to its original condition by the resiliency of the damper spring 75, the cam pin 69 is also returned to its original condition by the resiliency of the keep spring 71, the operating element 70, the supporting spring 66 and the push pin 67 are successively returned to their original conditions, the reed valve 65 is closed, and the oil pressure chamber 23 is returned to its original closed condition.

In accordance with this embodiment, at the time of reverse load, working oil within the oil pressure chamber 23 leaks to reduce pressure in the oil pressure chamber 23, whereby the transmitted torque reduces and the shock force at the time of reverse load is relieved. Accordingly, inconveniences such as vibrations will not occur even if a clutch for relieving the reverse load shock is not particularly provided as a means for relieving the reverse load. The reducing device 67 is incorporated into the clutch device CL itself and its structure itself is relatively simple, and therefore, the power transmission device in the vehicle can be made in compact, simplified and reduced in cost.

FIG. 16 shows a sixth embodiment of the present invention, in which an operating section 61' is provided in place of the operating section 61 in the embodiments of FIGS. 11 to 15.

The operating section 61' is composed of a flywheel 80 in the form of a dough-nut plate arranged between the piston 21 and the clutch outer housing 3 to press the push pin 67 to push out the reed valve 65, a connecting member (a hanger spring) 81 for moving said flywheel from the piston 21 through a suitable distance to locate the same, and a stopper circlip 82 for controlling movement in a direction away from the piston 21 of the flywheel 80. This connecting member 81 is constructed in a way such that both ends of a metal plate is bended in a direction opposite each other to thereby form an inclined portion 81C between both ends 81a and 81b distanced parallel to each other. In this embodiment, an end 81a is riveted to the flywheel 80, which end is arranged along the rotational direction between the piston 21 and the flywheel 80 and positioned frontwardly with respect to the normal rotational direction of the clutch outer housing 3 or the piston 21 (which is the direction rotated by the output of the engine, as indicated at the arrow A in FIGS. 17 and 18), whereas an end 81b positioned rearwardly is riveted to the piston 21, which end is provided to secure a spacing of suitable distance between the piston 21 and the flywheel 80 and to draw the flywheel 80 towards the piston 21 when the flywheel 80 tends to be rotated in the normal direction with respect to the piston 21.

Referring to FIGS. 17 and 18, a reference numeral 83 designates an escape hole provided for the riveting work, and a reference numeral 84 designates an escape groove provided to avoid interference with a head of the rivet when the flywheel 80 is drawn towards the piston 21.

In the clutch device constructed as described above, when the load (reverse load) acts on the rear wheel from the road surface due to the sudden deceleration, this reverse load is amplified by the speed change gear provided in the midst and transmitted to the clutch device. Then, a braking force acts on the piston 21, due to the reverse load, in a direction opposite the normal direction together with the clutch inner 6 and the clutch outer 3, and the flywheel 80 is about to rotate in the normal direction (as indicated at the arrow A) with respect to the piston 21 due to the inertia of the flywheel 80. When both the ends 81a and 81b of the connecting member 81 are pulled by said inertia force to increase the distance between both the ends 81a and 81b, the angle of inclination $\theta$ of an inclined portion 81c is made small through that amount, the flywheel 80 moves close to the piston 21, the push pin 67 is pressed to open the reed valve 65, and working oil in the oil pressure chamber 23 leaks. By this leakage, pressure in the oil pressure chamber 23 is reduced to decrease the torque capacity of the clutch device and the shock force resulting from the reverse load is relieved.

On the other hand, when the reverse load ceases to act, that is, when the flywheel 80 and the piston 21 are rotated together, the push pin 67 and the flywheel 80 are returned to their position by the resiliency of the connecting member 81 and by the resiliency of the reed valve 65, and the reed valve 65 is closed and the oil pressure chamber 23 is returned to its original closed condition. In the case the flywheel 80 is subjected to the rotative force in a reverse direction, movement of the flywheel 80 is controlled by the stopper circlip 82 to prevent useless flexure of the hanger spring 81. While in the above-described embodiment, the flywheel 80 is connected to the piston 21 through the connecting member 81, it should be noted that the flywheel could be connected to the clutch outer housing 3 as shown in FIG. 19 which shows a seventh embodiment. In this case, the angle of inclination $\theta$ of the inclined portion 81c of the connecting member 81 is large when the reverse load acts, and the flywheel 80 comes close to the piston 21 through that amount.

As described above, in accordance with this embodiment, when the reverse load acts, the flywheel 80 arranged between the piston 21 which forms the oil pressure chamber 23 and the clutch outer 3 is moved towards the piston 21, and the reed valve 65 provided on the piston is pushed open to open the oil pressure chamber 23, which constitute a pressure reducing device. With this pressure reducing device, when the reverse load acts, working oil in the oil pressure chamber leaks to reduce the pressure in the oil pressure chamber 23 whereby transmitted torque is decrease to relieve the shock force when the reverse load acts. Thus, the inconvenience such as vibrations will not occur even if the clutch for relieving the reverse load shock is not particularly provided as the means for relieving the reverse load. Furthermore, the pressure reducing device in this embodiment is incorporated into the clutch device itself and its structure itself is relatively simple, and therefore, the power transmission device in the vehicle can be made in compact, simplified and reduced in cost.

FIG. 20 is a sectional view showing an essential part of an eighth embodiment in accordance with the present invention, in which the feed pipe 24 is connected to a mouth piece 85 mounted on the crank case C through an orifice 47, and an oil pressure pipe 46 from the oil pump 42 (see FIG. 3) is connected to the mouth piece 85 through a pipe joint 87.

A bypass passage 88 is branched in the midst of the feed pipe 24, and a release valve 89 is provided in the midst of the bypass passage 88, which valve detects, at the time of sudden deceleration of the motorcycle, said sudden deceleration and opens. That is, an inlet pipe 88a which forms an upstream portion of the bypass passage 88 is branched at a downstream of the orifice 42b, the release valve 89 is provided on the other end of the inlet pipe 88a, and a discharge pipe 88b (which forms a downstream portion of the bypass passage 88) leading to the oil pan 40 (see FIG. 3) is connected to the outlet of the release valve 89.

In the case of this embodiment, a diaphragm valve is used as the release valve 89, and a negative pressure chamber 90 of the diaphragm valve 89 is communicated through a negative pressure passage 93 with a suction pipe 92 at a downstream of a carbureter 91 of the engine E. The diaphragm valve 89 has a valve body 95 which is seated on a valve seat 94 formed in the end of the inlet pipe 88a, a diaphragm 97 is mounted on a valve stem 96 of the valve body 95, and a spring 98 is arranged within the negative pressure chamber 90 defined by the diaphragm 97, said negative pressure 90 being connected to said negative pressure passage 93. A reference numeral 99 denotes an atmospheric pressure port for bringing a chamber above the diaphragm 97 into communication with atmospheric pressure. A reference numeral 100 denotes a seal member.

Operation of the device will now be described.

Under the normal running conditions of the motorcycle, since negative pressure of the suction pipe of the engine E is low (absolute pressure is high), the negative pressure of the negative pressure chamber 90 of the diaphragm valve 89 is also low, and the valve body 95 is biased towards the valve seat 94 by reaction of the spring 98 as shown in FIG. 20 and the diaphragm valve 89 remains closed. Thus, high oil pressure is supplied to the oil pressure chamber 23 through the feed pipe 24 to effect engagement of the clutch.

Figure 21:
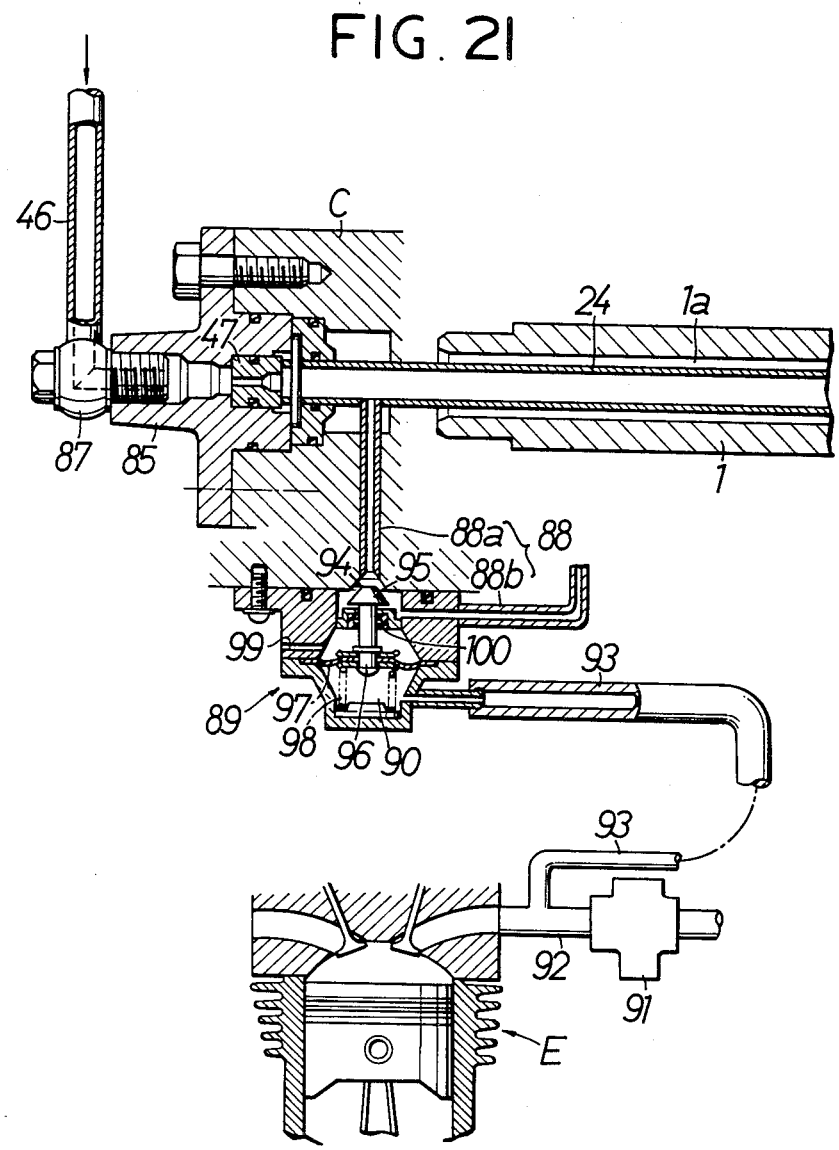

When sudden deceleration is effected by shift-down of the gear or the like, the negative pressure of the suction pipe on the side of the lower end of the carbureter abruptly increases (absolute pressure decreases), the negative pressure of the diaphragm valve 89 also increases abruptly, and the diaphragm 97 is actuated to open the diaphragm valve 89 as shown in FIG. 21. Thus, oil in the feed pipe 24 flows into the oil pan from the bypass passage 88 so that oil pressure in the oil pressure chamber 22 decreases, and the load acting on the pressure plate 7 is reduced to a level close to the load of only the clutch spring 31. Thus, even if the reverse load from the rear wheels, that is the load in a direction opposite to the normal direction in which the driven gear 2 is driven by the speed change gear 1 is generated, the friction plates 4, 5 slip each other with the result that just a little reverse load is merely transmitted towards the driven gear 2, thus towards the engine to relieve the shock at the time of deceleration and prevent vibrations such as hopping of the motorcycle.

FIG. 22 shows a ninth embodiment. In case of this embodiment, a magnet valve 101 is used as the release valve, and a pressure sensor 102 is connected to a negative pressure passage 93 from a suction pipe 92 at a downstream of the carbureter in such a way that the magnet valve 101 is opened and closed when the negative pressure sensed by the pressure sensor 102. Those other than the just mentioned configuration are the same as the previously described eighth embodiment.

In this embodiment, under the normal running conditions, since the negative pressure of the suction pipe is set to a low set value of the pressure sensor 102, the magnet valve 101 remains closed as shown in FIG. 22, and oil pressure acts on the pressure plate 7 for normal power transmission.

When the negative pressure of the suction pipe abruptly increases at the time of sudden deceleration and exceeds the set value of the pressure sensor 102, the magnet valve 102 is opened by a signal of the pressure sensor 102 to escape oil to lower oil pressure, thus preventing the shocks and vibrations caused by the reverse load in a manner as previously mentioned.

FIG. 23 shows a tenth embodiment. In this embodiment, the arrangement which uses the magnet valve 101 as the release valve is common to the above-described eighth embodiment, but means for sensing the sudden deceleration is different therefrom. This sudden deceleration sensing means will be described. The clutch outer housing 3 has a protruded portion 3b provided on the side thereof which protruded portion is inserted into a circumferentially elongated hole 74 bored in the web 2a of the driven gear 2 in such a way that said protruded portion may be relatively rotated (that is, differentially rotatable) through a small angle with respect to the driven gear 2 and connected to the driven gear 2 through a damper spring 75 in a damping fashion (which construction is as shown in the fifth embodiment). In this embodiment, however, a pulse detecting gear 103 having the same number of teeth as that of and provided in the same position as that of the driven gear 2 is formed on the outer housing peripheral portion of the clutch outer 3, and pulse detectors 104, 105 are respectively arranged in the vicinity of the outer periphery of the pulse detecting gear 103 and the driven gear 2, said both pulse detectors 104, 105 being electrically connected to a pulse-deviation detection/magnet valve operating amplification circuit (hereinafter merely referred to as "operating circuit") 106, said operating circuit 106 being electrically connected to the magnet valve 101.

In the above-described tenth embodiment, the above-described damping connection between the driven gear 2 and the clutch outer 8 is designed so that in the event the sudden variation in torque occurs, a differential rotation between the driven gear 2 and the clutch outer 8 occurs and at this time, the damper spring 75 is actuated to relieve the shock resulting from the sudden variation in torque. This is true for the case where the reverse load is applied from the side of the rear wheels at the time of sudden deceleration, and a differential rotation with a small angle occurs between the driven gear 2 and the clutch outer housing 3. Under the normal running conditions, there is no differential rotation between the driven gear 2 and the pulse detecting gear 103 of the clutch outer housing 3, and therefore, the teeth of both the gears are rotated together as shown in FIG. 24A, and pulses generated by the pulse detectors 104 and 105 have no deviation in phase as shown in FIG. 25A. However, when the reverse load occurs due to the sudden deceleration, the differential rotation occurs between the driven gear 2 and the clutch outer housing 3 as previously mentioned and a deviation occurs between the teeth of both the driven gear 2 and the pulse detecting gear 103. That is, a deviation as shown in FIG. 24C results via the transient condition as shown in FIG. 24B. In this case, the pulses generated by the pulse detectors 104 and 105 are deviated in phase as in FIG. 25B corresponding to FIG. 24B and as in FIG. 25C corresponding to FIG. 24C. In these figures, the solid line A indicates the output of pulse of the pulse detector 105 on the side of the driven gear 2, and the dotted line indicates the output of pulse of the pulse detector 104. As described above, if the phase of pulse is deviated, the deviation of phase of pulse is detected in the operating circuit 106 and the magnet valve operating amplifier is actuated to open the magent valve 101. The operation after the magnet valve 101 has been opened is the same as the case of the eighth and ninth embodiments. It is noted that the operating circuit 106 is actuated when the deviation of phase of pulse exceeds a given value, and can be a circuit wherein only during the given time when deviation of phase of pulse occurs, the magnet valve 101 is made open and again made closed.

As described above, in the eighth to tenth embodiments, the bypass passage 88 is branched in the midst of the feed pipe 22 and the release valves 89, 101 which sense, at the time of sudden deceleration of the vehicle, said sudden deceleration and are opened. Therefore, in the event the reverse load from the rear wheel side occurs at the time of sudden deceleration of the vehicle, the release valves 89, 101 are opened to escape oil to reduce oil pressure, thus reducing a load for pressing friction plates by the pressure plate 7. Thus, when the great reverse load is present, the friction plates 4, 5 slip each other, and the shock resulting from the reverse load is relieved to prevent occurrence of vibrations of the vehicle. And said shock and vibrations resulting from the reverse load can be prevented by an extremely simple construction without need of arrangement of a reverse-load shock relieving clutch separately from the hand-operated clutch in the driving system as in prior arts, and the power transmission device of the vehicle can be made in compact and reduced in cost.

What is claimed is:

1. A friction clutch device having a plurality of alternating driving and driven friction plates, a hydraulic device for moving said friction plates in a preset direction to apply pressing force to said friction plates to engage said clutch, means for applying hydraulic pressure to said hydraulic device, spring means for applying pressing force to said friction plates in said preset direction to engage said clutch, and a release device for releasing engagement of the clutch, said release device including means for mechanically releasing said pressing force of said spring means applied to said friction plates for releasing said clutch.

2. A friction clutch device which can assume an engaged position by applying a pressing force to friction plates in a preset direction and can assume a disengaged position by releasing said pressing force, said device comprising a clutch spring capable of springing said friction plates in said preset direction, a hydraulic device capable of generating oil pressure for likewise pressing said friction plates in said preset direction, said hydraulic device comprises an oil pressure chamber formed between a pressure plate for pressing said friction plates in said preset direction and a piston provided in a fixed position oppositely to said pressure plate, and a release device which, when in inoperative conditions, permits the springing force of said clutch spring and the oil pressure of said hydraulic device to act as said pressing force with respect to said friction plates and which, when in operative condition, effects the discharge of oil pressure from said hydraulic device and the release of the springing force of said clutch spring with respect to said friction plates, said release device comprises an escape hole bored in a pressure receiving surface of said pressure plate, a reed valve provided on the pressure receiving surface and capable of blocking said escape hole, a control pin which pushes said reed valve inwardly of said oil pressure chamber to open said escape hole, a discharge hole for discharging oil which is introduced through said escape hole to an outward portion which is located on the side opposite to the side of the friction plates in a web portion in a clutch center, and a communication hole which brings outward and inward portions of the web in the clutch center into communication with each other.

3. A friction clutch device according to claim 2, wherein a lifter plate mounted axially movably away from said pressure plate through a given clearance is biased by means of a clutch spring in a direction for pressing said pressure plate in said preset direction, and a control spring arranged between said pressure plate and said lifter plate to bias both said pressure plate and said lifter plate in a direction of moving apart from each other.

4. A friction clutch device according to claim 2, wherein the lifter plate mounted axially movably away from said pressure plate through a given clearance is biased by the clutch spring in a direction of pressing the pressure plate in said preset direction, said clutch spring being directly engaged with the lifter plate.

5. A friction clutch device which can assume an engaged position by applying a pressing force to friction plates in a preset direction and can assume a disengaged position by releasing said pressing force, said device comprising a clutch spring capable of springing said friction plates in said preset direction, a hydraulic device capable of generating oil pressurre for likewise pressing said friction plates in said preset direction, and a release device which, when in inoperative conditions, permits the springing force of said clutch spring and the oil pressure of said hydraulic device to act as said pressing force with respect to said friction plates and which, when in operative condition, effects the discharge of oil pressure from said hydraulic device and the release of the springing force of said clutch spring with respect to said friction plates, at least one of said friction plates is axially movably supported on a clutch outer housing resiliently coupled to a driven gear while allowing a slight relative rotation, at least one of the other of said friction plates is supported alternately with said one of said friction plates axially movably on a clutch inner member within said clutch outer housing, the pressure plate is axially movably arranged between the clutch inner member and the clutch outer housing to press said one of said friction plates and said other of said friction plates, a piston is fixedly arranged to form an oil pressure chamber between the piston and said pressure plate to constitute said hydraulic device, and a pressure reducing device is provided in association with said hydraulic device, said pressure reducing device comprising a leak hole which extends through said piston in an axial direction of a transmission shaft to bring the oil pressure chamber into communication with the side of the clutch outer housing, a reed valve for blocking said leak hole from the side of the oil pressure chamber, a through-hole which extends through an end wall of said clutch outer housing in an axial direction of the transmission shaft, a cam pin which is inserted into said through-hole, biased towards the driven gear so that a foremost end thereof comes into abutment with the web portion of said driven gear and pushes open said reed valve when the cam pin is moved towards the piston, and a cam groove formed in the web with which the cam pin abuts in such a way that said cam pin is moved towards the piston when a circumferential displacement between said driven gear and said clutch outer housing occurs.

6. A friction clutch which can assume an engaged position by applying a pressing force to friction plates in a preset direction and can assume a disengaged position by releasing said pressing force, said device comprising a clutch spring capable of springing said friction plates in said preset direction, a hydraulic device capable of generating oil pressure for likewise pressing said friction plates in said preset direction, and a release device which, when in inoperative conditions, permits the springing force of said clutch spring and the oil pressure of said hydraulic device to act as said pressing force with respect to said friction plates and which, when in inoperative condition, effects the discharge of oil pressure from said hydraulic device and the release of the springing force of said clutch spring with respect to said friction plates, at least one of said friction plates is axially movably supported on a clutch outer housing, at least one of the other of said friction plates is supported alternately with the one of said friction plates axially movably on a clutch inner member within said clutch outer housing, the pressure plate is axially movably arranged between the clutch inner member and the clutch outer housing to press said one of said friction plates and said other of said friction plates, the piston is fixedly arranged to form an oil pressure chamber between the piston and said pressure plate to constitute said hydraulic device, and a pressure reducing device is provided in association with said hydraulic device, said pressure reducing device comprising a leak hole which extends through said piston in an axial direction to bring the oil pressure chamber into communication with the side of the clutch outer housing, a reed valve for blocking said leak hole from the side of the oil pressure chamber, a push pin which passes through said piston in such a way that one end thereof comes into abutment with the reed valve whereas the other end thereof is protruded on the side of the clutch outer housing, a flywheel arranged between said piston and said clutch outer housing to press said push pin to push open the reed valve, and a connecting member which is formed by bending both ends of a metal plate in an opposite direction, one end thereof being connected to the flywheel, the other end thereof being connected to the clutch outer housing whereby only when said flywheel has a rotative force in a normal direction with respect to said clutch outer housing, the flywheel is moved towards said clutch outer housing to press said push pin.

7. A friction clutch device according to claim 1, wherein a bypass passage is branched in the midway of a feed pipe to said means for applying hydraulic pressure to said hydraulic device, a release valve in said bypass passage and means for causing said release valve to open at the time of sudden deceleration of the vehicle.

* * * * *